(12) United States Patent
Tanaka et al.

(10) Patent No.: US 10,981,441 B2
(45) Date of Patent: Apr. 20, 2021

(54) TORQUE ROD

(71) Applicant: SUMITOMO RIKO COMPANY LIMITED, Komaki (JP)

(72) Inventors: Shingo Tanaka, Komaki (JP); Takashi Hayashi, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 304 days.

(21) Appl. No.: 16/167,896

(22) Filed: Oct. 23, 2018

(65) Prior Publication Data

US 2019/0054813 A1 Feb. 21, 2019

Related U.S. Application Data

(63) Continuation of application No. PCT/JP2017/042663, filed on Nov. 28, 2017.

(30) Foreign Application Priority Data

Apr. 25, 2017 (JP) .............................. JP2017-086058

(51) Int. Cl.
*B60K 5/12* (2006.01)
*F16F 15/08* (2006.01)
(Continued)

(52) U.S. Cl.
CPC .............. *B60K 5/1291* (2013.01); *B60K 5/12* (2013.01); *B60K 5/1208* (2013.01);
(Continued)

(58) Field of Classification Search
CPC ...... B60K 5/1291; B60K 5/12; B60K 5/1208; B60K 5/1241; F16F 1/38; F16F 1/3828; F16F 1/3873; F16F 15/08
(Continued)

(56) References Cited

U.S. PATENT DOCUMENTS

| | | | |
|---|---|---|---|
| 5,246,248 A | * | 9/1993 | Ferguson ............. B60G 21/051 267/141.3 |
| 7,350,775 B2 | * | 4/2008 | Sato ..................... F16F 13/1445 267/140.12 |

(Continued)

FOREIGN PATENT DOCUMENTS

| | | |
|---|---|---|
| EP | 1247678 A2 | 10/2002 |
| JP | 2000-65113 A | 3/2000 |
| JP | 4442371 B2 | 3/2010 |

OTHER PUBLICATIONS

Feb. 13, 2018 International Search Report issued in International Patent Application No. PCT/JP2017/042663.

*Primary Examiner* — Thomas J Williams
*Assistant Examiner* — James K Hsiao
(74) *Attorney, Agent, or Firm* — Oliff PLC

(57) ABSTRACT

A torque rod for straddling connection target members including a rod member and a rubber bushing provided to a lengthwise end of the rod member. The rubber bushing includes an inside shaft member, an outer peripheral member to be attached to one of the connection target members, and a rubber elastic body connecting the inside shaft member and the outer peripheral member. The rubber bushing is a part separate from the rod member and the end of the rod member is fixed to the inside shaft member. The rod member includes an abutting face to abut against the one of the connection target members without interposing the outer peripheral member of the rubber bushing. A stopper to limit an amount of elastic deformation of the rubber elastic body in the rubber bushing is constituted by including the abutting face of the rod member.

10 Claims, 3 Drawing Sheets

(51) Int. Cl.
*F16F 1/38* (2006.01)
*F16F 1/387* (2006.01)
(52) U.S. Cl.
CPC .............. *B60K 5/1241* (2013.01); *F16F 1/38* (2013.01); *F16F 1/3828* (2013.01); *F16F 1/3873* (2013.01); *F16F 15/08* (2013.01)
(58) Field of Classification Search
USPC .................................................... 267/140.11
See application file for complete search history.

(56) References Cited

U.S. PATENT DOCUMENTS

| | | | |
|---|---|---|---|
| 9,347,517 B2 * | 5/2016 | Yokawa | B60K 5/1241 |
| 9,505,285 B2 * | 11/2016 | Sugimoto | F16F 1/3828 |
| 2007/0018367 A1 * | 1/2007 | Kamei | F16F 7/123 |
| | | | 267/140.12 |
| 2013/0320181 A1 * | 12/2013 | Kamei | F16F 1/3849 |
| | | | 248/548 |
| 2015/0129742 A1 * | 5/2015 | Okanaka | F16F 15/08 |
| | | | 248/634 |
| 2015/0219182 A1 * | 8/2015 | Shimada | B60K 5/1208 |
| | | | 267/140.5 |
| 2016/0152127 A1 * | 6/2016 | Inatomi | F16F 15/02 |
| | | | 248/674 |
| 2016/0176279 A1 * | 6/2016 | Inatomi | F16F 1/3849 |
| | | | 248/638 |
| 2016/0341275 A1 * | 11/2016 | Kaneko | F16F 1/3828 |
| 2019/0346001 A1 * | 11/2019 | Tanaka | F16F 1/3849 |

* cited by examiner

TORQUE ROD

INCORPORATED BY REFERENCE

This application is a Continuation of International Application No. PCT/JP2017/042663 filed Nov. 28, 2017, which claims priority under 35 U.S.C. §§ 119(a) and 365 of Japanese Patent Application No. 2017-086058 filed on Apr. 25, 2017, the disclosures of which are expressly incorporated herein by reference in their entireties.

BACKGROUND OF THE INVENTION

1. Field of the Invention

The present invention relates generally to a torque rod used for connecting a power unit to a vehicle body in an automobile, for example. More particularly, the present invention pertains to a torque rod including a stopper for limiting an amount of relative displacement between the components connected to each other, as well as to a rod member and a rubber bushing that constitute the torque rod.

2. Description of the Related Art

Conventionally, there is known a torque rod that connects a power unit and a vehicle body so as to support torque reaction force of the power unit. As described in Japanese Unexamined Patent Publication No. JP-A-2000-065113, for example, the torque rod includes rubber bushings on lengthwise opposite ends thereof, and is configured such that one rubber bushing is attached to the power unit, while the other rubber bushing is attached to the vehicle body.

Meanwhile, with respect to the torque rod of conventional construction, as described in JP-A-2000-065113, a tubular outer peripheral member is integrally formed with the lengthwise end of the torque rod, and to the outer peripheral member, attached is the rubber bushing including an inside shaft member spaced away therefrom to the radial inside. The inside shaft member is configured to be fixed and mounted to the vehicle body.

However, with such torque rod of conventional construction, the inside shaft member in the center is fixed to the vehicle body, and the outer peripheral member having a large diameter on the outer peripheral side undergoes displacement relative to the vehicle body during input of a load. Accordingly, the vehicle body requires a space around the outer peripheral member that is slightly larger than the outer peripheral member so as to avoid interference of the outer peripheral member with the vehicle body side, making it difficult to meet a demand for space savings.

In light of such a problem, the present applicant disclosed a torque rod in Japanese Patent No. JP-B-4442371, wherein the rod member is a separate structure from the rubber bushing including the inside shaft member and the outer peripheral member, and the lengthwise end of the rod member is coupled to the inside shaft member of the rubber bushing, while the outer peripheral member of the rubber bushing is fixed to the vehicle body. With the torque rod having such structure, since the outer peripheral member is fixed to the vehicle body, the problem of interference of the outer peripheral member with the vehicle body side may be avoided, thereby achieving space savings or the like during installation of the torque rod.

However, with the torque rod as described in JP-B-4442371, the rod member is connected to the inside shaft member of the rubber bushing that is the separate structure. This may makes it difficult to obtain strength and reliability with respect to a large load such as a stopper load due to relative abutment of the inside shaft member and the outer peripheral member of the rubber bushing.

SUMMARY OF THE INVENTION

It is therefore one object of the present invention to provide a torque rod of novel structure which is able to achieve space savings for mounting the rubber bushing provided to the lengthwise end of the rod member, while improving load bearing capability and enduring performance with respect to a large load such as a stopper load.

A first mode of the present invention provides a torque rod configured to be mounted astride connection target members, comprising: a rod member; and a rubber bushing provided at a lengthwise end of the rod member, wherein the rubber bushing includes an inside shaft member, an outer peripheral member spaced away from the inside shaft member to an outer peripheral side and configured to be attached to one of the connection target members, and a rubber elastic body connecting the inside shaft member and the outer peripheral member with each other, the lengthwise end of the rod member is fixed to the inside shaft member of the rubber bushing constituted by a part separate from the rod member, and the rod member includes an abutting face to abut against the one of the connection target members without interposing the outer peripheral member of the rubber bushing, and a stopper to limit an amount of elastic deformation of the rubber elastic body in the rubber bushing is constituted by including the abutting face of the rod member.

According to the torque rod constructed following the present mode, during input of a load, the stopper limits the amount of elastic deformation of the rubber elastic body of the rubber bushing. This may prevent the rubber elastic body from being damaged or the like due to excessive deformation of the rubber elastic body, thereby improving load bearing capability and durability. Here, since the stopper includes the abutting face of the rod member configured to abut against the connection target member, the stopper load will be applied to the rod member from the connection target member without interposing the inside shaft member. Therefore, even in the case in which a large stopper load is applied, it is possible to readily obtain strength and durability with respect to the stopper load regardless of strength at the portion where the inside shaft member and the rod member are fixed or the like.

Besides, at the connection portion of the torque rod to the connection target member such as the vehicle body, the outer peripheral member of the rubber bushing is fixed to the connection target member, so that the inside shaft member fixed to the rod member undergoes displacement between the opposite outer peripheral member and the connection target member. Therefore, at the connection portion of the connection target member to the torque rod, there is no need to ensure a large space around the outer peripheral member. This configuration makes it possible for the torque rod connected to the connection target member via the rubber bushing to obtain a sufficient amount of elastic displacement relative to the connection target member, while achieving space savings for the connection portion.

A second mode of the present invention provides the torque rod according to the first mode, wherein the torque rod has another rubber bushing with a different outer dimension from an outer dimension of the rubber bushing, at another lengthwise end of the rod member, the outer dimension of the rubber bushing is larger than the outer dimension of the other rubber bushing, and the lengthwise end of the rod member is fixed to the inside shaft member of the rubber bushing, and the rod member includes the abutting face to abut against the connection target member to which the rubber bushing is configured to be attached.

According to the torque rod constructed following the present mode, by making the rubber bushing larger in outer dimension, a sufficient rubber volume can be ensured for the rubber elastic body constituting the rubber bushing. In particular, by applying the stopper of construction according to the present invention to the rubber bushing that is larger in outer dimension, it is more effectively possible to obtain a sufficient amount of elastic deformation of the rubber elastic body and to achieve space savings for the connection portion in a compatible manner.

A third mode of the present invention provides the torque rod according to the first or second mode, wherein the outer peripheral member of the rubber bushing includes an aperture window extending partially in a peripheral direction, and the abutting face of the rod member is configured to abut against the one of the connection target members via the aperture window.

According to the torque rod constructed following the present mode, the aperture window is provided to the outer peripheral member, and the rod member and the connection target member come into abutment via the aperture window. Accordingly, complicated shapes of the outer peripheral member and the connection target member can be avoided, thereby enhancing a degree of freedom in selecting the connection target member.

A fourth mode of the present invention provides the torque rod according to the third mode, wherein the aperture window is formed astride opposite sides of the outer peripheral member in an axial direction such that the outer peripheral member is cut by the aperture window in the peripheral direction, and the abutting face comprises a lengthwise tip face of the rod member, and the stopper is constituted by the abutting face abutting against the one of the connection target members via the aperture window of the outer peripheral member.

The torque rod of construction according to the present mode is able to realize the stopper for limiting the amount of elastic deformation of the rubber elastic body in the direction of mutual approach of the connection target members to which the torque rod is mounted. Moreover, in the stopper, the stopper load from the connection target member is applied in the lengthwise direction of the rod member. Thus, by allowing the stopper load to act in the axial direction of the rod member, for example, shear or bending stress may be suppressed and compressive strength of the rod member may be more efficiently utilized, making it possible to improve load bearing capability of the stopper.

A fifth mode of the present invention provides the torque rod according to any one of the first through fourth modes, wherein an abutting projection projecting toward an inside of the rubber bushing is provided in the rod member and located closer to a lengthwise center of the rod member than a portion fixed to the inside shaft member of the rubber bushing in the lengthwise end of the rod member is, and the abutting projection is opposed to the outer peripheral member via a cushioning rubber in a lengthwise direction of the rod member so that a sub-stopper is constituted, the sub-stopper being configured to limit an amount of elastic deformation of the rubber elastic body in a direction opposite to a direction of the elastic deformation to be limited by the stopper.

The torque rod of construction according to the present mode is able to realize the sub-stopper for limiting the amount of elastic deformation of the rubber elastic body in the direction of mutual separation of the connection target members to which the torque rod is mounted. Moreover, in the sub-stopper, the stopper load from the outer peripheral member is applied in the lengthwise direction of the rod member. Thus, by allowing the stopper load to act in the axial direction of the rod member, for example, shear or bending stress may be suppressed and tensile strength of the rod member may be more efficiently utilized, making it possible to improve load bearing capability.

A sixth mode of the present invention provides the torque rod according to the fifth mode, wherein the rubber bushing includes a lightening space provided at one side of the inside shaft member in a lengthwise direction of the rod member, and the sub-stopper is constituted in the lightening space so that the amount of the elastic deformation of the rubber elastic body in the direction opposite to the direction of the elastic deformation to be limited by the stopper is limited at the one side of the inside shaft member in the lengthwise direction of the rod member.

The torque rod of construction according to the present mode is able to constitute the sub-stopper by advantageously utilizing the lightening space. Besides, the lightening space makes it possible to adjust spring characteristics of the rubber elastic body of the rubber bushing.

A seventh mode of the present invention provides the torque rod according to any one of the first through sixth modes, wherein the outer peripheral member of the rubber bushing has a cut-out window opened at an axial end edge thereof, and the rod member fixed to the inside shaft member of the rubber bushing is disposed to extend inward and outward of the outer peripheral member in a state of being inserted through the cut-out window.

According to the torque rod constructed following the present mode, the cut-out window is provided to the outer peripheral member so as to be opened at the axial end edge thereof, and the rod member is inserted in the cut-out window and fixed to the inside shaft member. Thus, the rod member, which has a shape in which, for example, the center axis of at least the lengthwise end extends roughly straightly in the axis-perpendicular direction of the rubber bushing, is allowed to be superposed and fixed to the inside shaft member from the axial outside. By so doing, the projecting dimension of the torque rod in the axial direction of the rubber bushing can be minimized. Besides, as the rod member, it is possible to adopt the shape in which the center axis of at least the lengthwise end extends roughly straightly in the axis-perpendicular direction of the rubber bushing, thereby achieving space savings for mounting the rod member, and improving load bearing capability as well.

An eighth mode of the present invention provides the torque rod according to any one of the first through seventh modes, wherein an attachment projecting to the outer peripheral side is provided at the outer peripheral member of the rubber bushing.

The torque rod of construction according to the present mode makes it possible to readily fix the outer peripheral member to the connection target member such as the vehicle body by utilizing the attachment that projects to the outer peripheral side.

A ninth mode of the present invention provides the torque rod according to any one of the first through eighth modes, wherein the end of the rod member is superposed and fixed by bolting to an axial end face of the inside shaft member of the rubber bushing.

According to the torque rod constructed following the present mode, the rod member and the inside shaft member of the rubber bushing are fixed to each other by bolting. Thus, the two members can be readily fixed in a detachable manner with a simple structure.

Furthermore, the torque rod according to the present invention as described above in the first through ninth modes may advantageously be realized by a rod member to be described in the tenth mode below or a rubber bushing to be described in the eleventh mode below.

A tenth mode of the present invention provides a rod member configured to be provided with a rubber bushing including an inside shaft member and an outer peripheral member spaced away from the inside shaft member to an outer peripheral side that are connected by a rubber elastic body with each other, the rod member constituting a torque rod to be mounted astride connection target members, the rod member comprising, at one lengthwise end thereof: a fixture to the inside shaft member of the rubber bushing; and an abutting face constituting a stopper, the stopper being configured to limit an amount of elastic deformation of the rubber elastic body of the rubber bushing by abutment of the abutting face against one of the connection target members to which the rubber bushing is attached.

An eleventh mode of the present invention provides a rubber bushing configured to be mounted at a lengthwise end of a rod member such that the rubber bushing constitutes a torque rod to be mounted astride connection target members, the rubber bushing comprising: an inside shaft member; an outer peripheral member spaced away from the inside shaft member to an outer peripheral side; a rubber elastic body connecting the inside shaft member and the outer peripheral member with each other; a fixture configured to receive the lengthwise end of the rod member, the fixture being provided in the inside shaft member; and a cushioning rubber to be arranged between opposite faces of a tip end of the rod member in the lengthwise direction and one of the connection target members, the cushioning rubber being configured to moderate impact of abutment of the tip end of the rod member against the one of the connection target members in a stopper provided by the abutment to limit an amount of elastic deformation of the rubber elastic body.

According to the present invention, with the torque rod, it is possible to achieve space savings for mounting the rubber bushing provided to the lengthwise end of the rod member, while improving load bearing capability and enduring performance with respect to a large load such as a stopper load.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein.

DETAILED DESCRIPTION OF EMBODIMENTS

Figure 1:
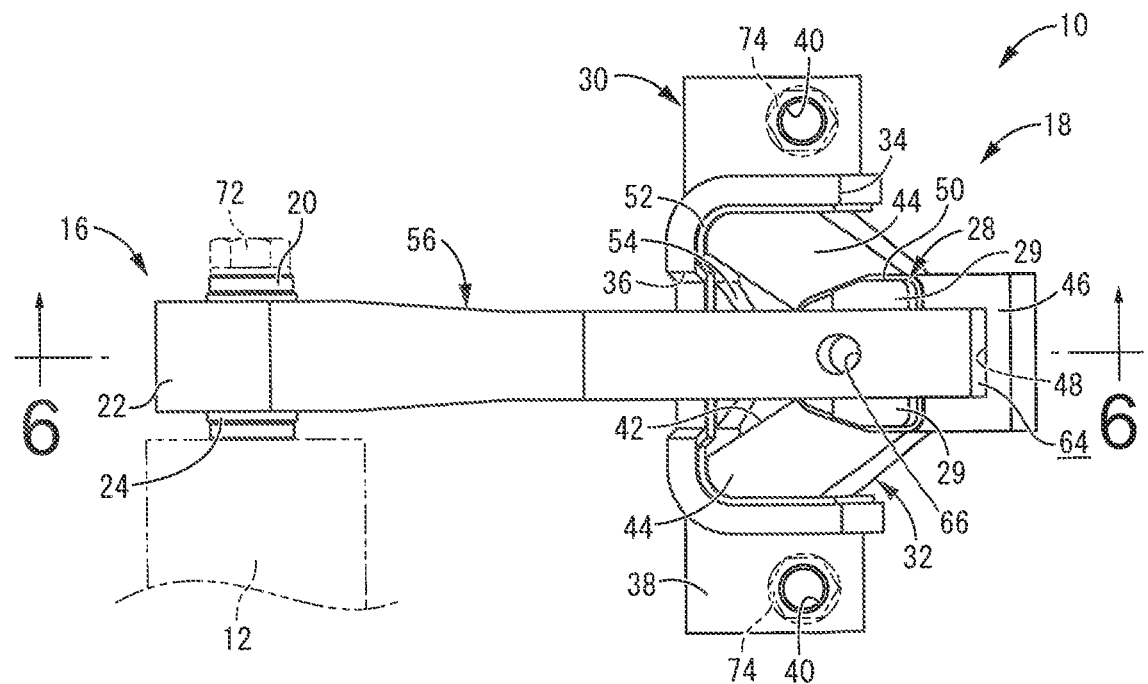
FIG. 1 is a top plan view showing a torque rod as a first embodiment of the present invention.
Figure 2:
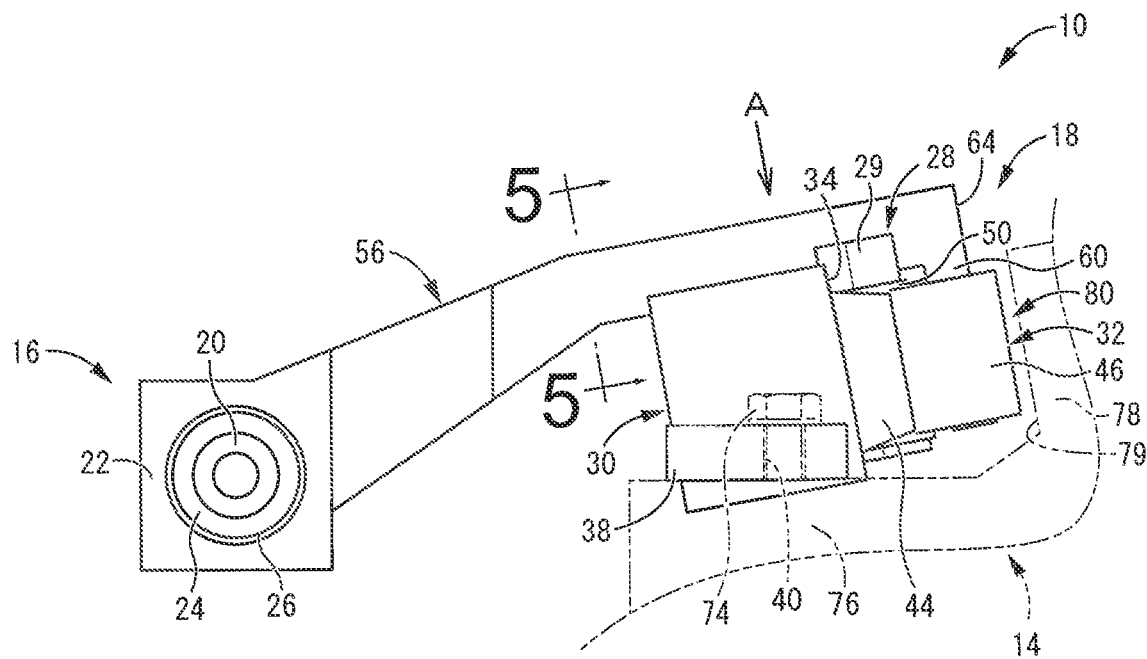
FIG. 2 is a front view of the torque rod shown in FIG. 1.
Figure 3:
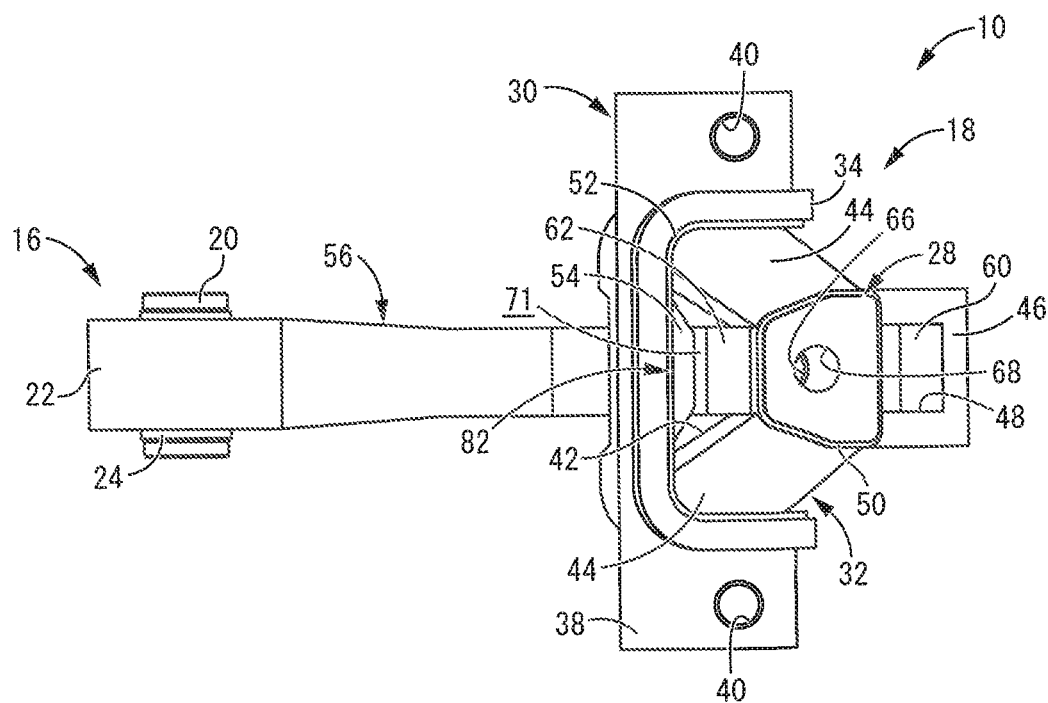
FIG. 3 is a bottom plan view of the torque rod shown in FIG. 1.

An embodiment of the present invention will be described below in reference to the drawings.

First, a torque rod 10 according to a first embodiment of the present invention is depicted in FIGS. 1 through 7. The torque rod 10 is mounted astride a power unit 12 and a vehicle body 14 serving as connection target members, and elastically connects the power unit 12 to the vehicle body 14. In general, the torque rod is mounted onto the vehicle so as to extend in the vehicle front-back direction, thus in the description hereinbelow, explanation will be given assuming that the left-right direction in FIG. 1 refers to the vehicle front-back direction. However, the torque rod 10 according to the present invention is not limited to that mounted so as to extend in the vehicle front-back direction. Besides, in the following description, the up-down direction refers to the up-down direction in FIG. 2, while the left-right direction refers to the down-up direction in FIG. 1.

Described more specifically, the torque rod 10 according to the present embodiment extends in the vehicle front-back direction. A first rubber bushing 16 is provided to the lengthwise first end of the torque rod 10 (leftward in FIG. 1), while a second rubber bushing 18 is provided to the lengthwise second end of the torque rod 10 (rightward in FIG. 1). This second rubber bushing 18 serves as the rubber bushing according to the present invention.

The first rubber bushing 16 includes an inner axial member 20 and an outer tubular member 22 each having a roughly tubular shape and extending in the left-right direction, and a rubber elastic body 24 disposed radially between the inner axial member 20 and the outer tubular member 22. Specifically, the inner axial member 20 is internally disposed into the outer tubular member 22 in a roughly concentric manner, so as to be elastically connected by the rubber elastic body 24. The inner axial member 20 has an axial dimension (an up-down dimension in FIG. 1) which is larger than that of the outer tubular member 22, so that the inner axial member 20 projects from the axially opposite sides of the outer tubular member 22. In the present embodiment, the outer peripheral configuration of the outer tubular member 22 is an approximate rectangle.

Moreover, in the present embodiment, a metallic sleeve 26 is externally disposed about the inner axial member 20. Accordingly, the rubber elastic body 24 is bonded to the outer circumferential surface of the inner axial member 20, while the rubber elastic body 24 is bonded to the inner circumferential surface of the metallic sleeve 26. In this embodiment in particular, the rubber elastic body 24 takes the form of an integrally vulcanization molded component including the inner axial member 20 and the metallic sleeve 26. By the integrally vulcanization molded component being inserted in a press-fit state and fixed to the outer tubular member 22, the first rubber bushing 16 is provided.

Meanwhile, the second rubber bushing 18 includes an inside shaft member 28 having a roughly tubular shape, an outer peripheral member 30 spaced away from the inside shaft member 28 to the outer peripheral side, and a rubber elastic body 32 disposed between the opposite faces of the inside shaft member 28 and the outer peripheral member 30. Specifically, the inside shaft member 28 is internally disposed into the outer peripheral member 30, and the two members 28, 30 are elastically connected by the rubber elastic body 32. In the present embodiment, the center axis of the inside shaft member 28 inclines with respect to the up-down direction, so that the inside shaft member 28 inclines to the side of the first rubber bushing 16 as it goes upward. Besides, the upper end face of the inside shaft member 28 in FIG. 7, which is the axial end face of the inside shaft member 28, is provided with a pair of positioning protrusions 29, 29 that protrude axially outward and are opposed to each other in the width direction (the up-down direction in FIG. 1) with a prescribed distance in between.

Moreover, the outer peripheral member 30 has a configuration in which a roughly tubular member includes an aperture window 34 extending partially in the peripheral direction. In the present embodiment, the aperture window 34 is formed astride the opposite sides of the outer peripheral member 30 in the axial direction (the up-down direction in FIG. 7, which is the direction of the center axis when the outer peripheral member is assumed to have a roughly tubular shape). That is, the aperture window 34 has a height dimension (an up-down dimension in FIG. 7) that is approximately equal to the axial dimension of the outer peripheral member 30. Additionally, the aperture window 34 has a peripheral dimension that spans about half the periphery. With this configuration, the outer peripheral member 30 has a roughly semicircular tube shape or a roughly overturned U-letter shape. Specifically, when the outer peripheral member is assumed to have a roughly tubular shape, by providing the aperture window 34, the outer peripheral member 30 has a shape in which the vehicle back-side portion thereof is removed. Accordingly, the outer peripheral member having a roughly tubular shape is cut by the aperture window 34, so as to provide the outer peripheral member 30 having a partial peripheral wall shape that does not continue along the entire periphery in the peripheral direction.

The aperture window 34 is provided on the vehicle back side of the outer peripheral member 30, and the outer peripheral member 30 is opposed to the inside shaft member 28 so as to cover the vehicle front side of the inside shaft member 28 on the outer peripheral side thereof, while opening to the vehicle back side. The center axis direction of the outer peripheral member 30 is approximately parallel to the center axis direction of the inside shaft member 28, and inclines with respect to the up-down direction. Besides, the center axis of the outer peripheral member 30 is positioned on the roughly same axis of the center axis of the inside shaft member 28 or is positioned so as to shift to the vehicle back side from the center axis of the inside shaft member 28.

Figure 7:
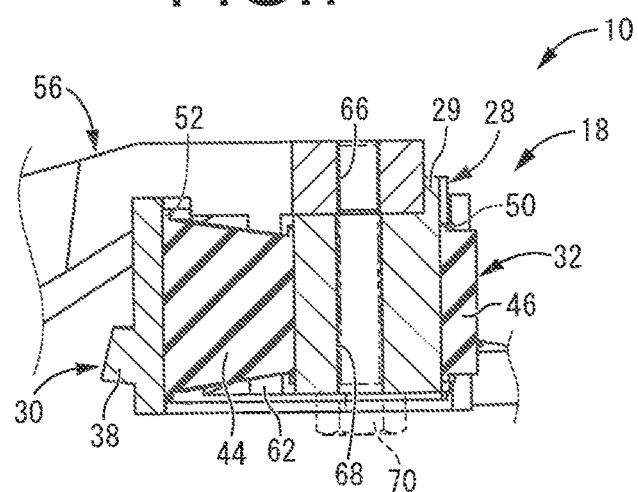
FIG. 7 is a cross sectional view taken along line 7-7 of FIG. 4.

In the present embodiment, the inside shaft member 28 excluding the positioning protrusions 29, 29 has an axial dimension (an up-down dimension in FIG. 7) that is slightly shorter than the axial dimension of the outer peripheral member 30. Thus, the lower end of the inside shaft member 28 in FIG. 7 is positioned axially inside (upper side in FIG. 7) of the lower end of the outer peripheral member 30 in FIG. 7, while the upper end of the inside shaft member 28 in FIG. 7 excluding the positioning protrusions 29, 29 is positioned axially inside (lower side in FIG. 7) of the upper end of the outer peripheral member 30 in FIG. 7.

Figure 5:
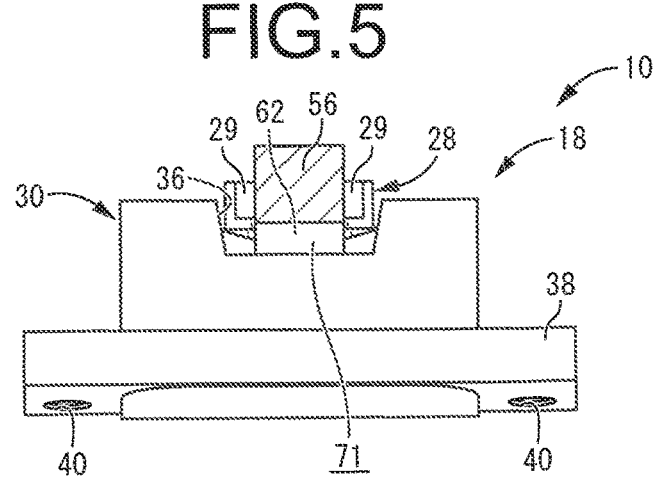
FIG. 5 is a cross sectional view taken along line 5-5 of FIG. 2.
Figure 6:
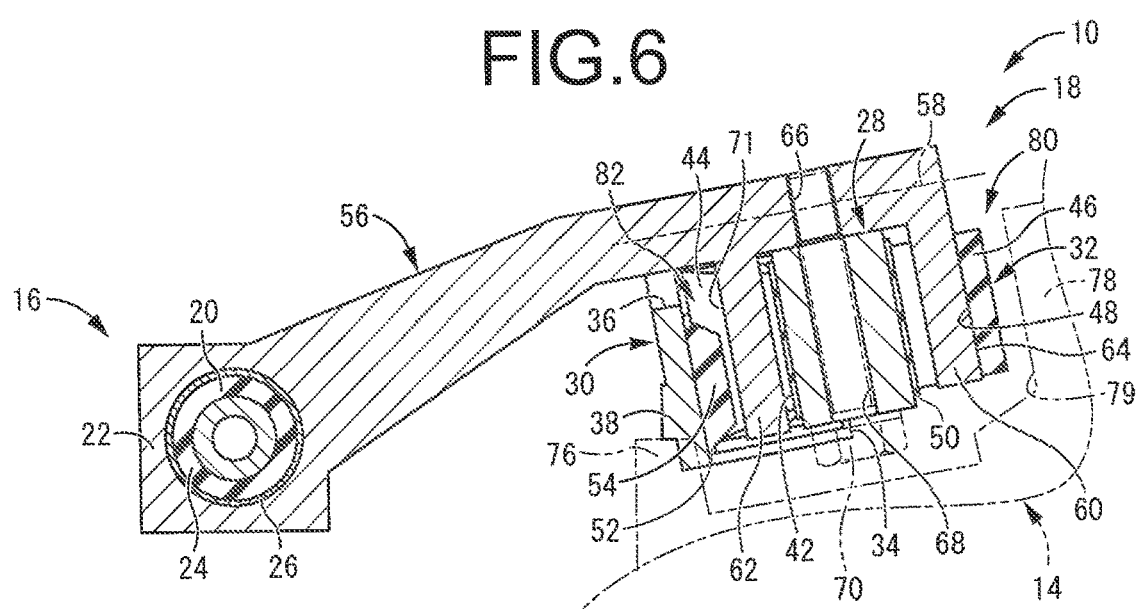
FIG. 6 is a cross sectional view taken along line 6-6 of FIG. 1.

Additionally, in the front portion of the outer peripheral member 30, formed is a cut-out window 36 opened upward in FIG. 5 at the upper end edge in FIG. 5, which is the axial end edge of the outer peripheral member 30. The cut-out window 36 has an approximately rectangular shape, and perforates the outer peripheral member 30 in the thickness direction. Besides, the cut-out window 36 has a depth dimension (an up-down dimension in FIG. 5) that does not reach the axial end edge on the opposite side of the outer peripheral member 30 (the lower end edge in FIG. 5), namely, about one-third of the axial dimension of the outer peripheral member 30 in the present embodiment. With this configuration, with respect to the radially inner surfaces of the cut-out window 36, the radially inner surface at the lower end in FIG. 5 is positioned below the upper end face of the inside shaft member 28 in FIG. 5, which is the axial end face thereof excluding the positioning protrusions 29, 29.

Furthermore, the outer peripheral member 30 includes an attachment 38 projecting from the vicinity of its lower portion to the outer peripheral side. In the present embodiment, the attachment 38 is formed close to the lower end of the outer peripheral member 30 so as to have a roughly thick-walled plate shape extending about the roughly entire periphery in the peripheral direction. Particularly on the opposite sides in the left-right direction, the attachment 38 has a large projecting dimension outward in the left-right direction. These left-right opposite side portions of the attachment 38 having a large projecting dimension are respectively perforated by bolt insertion holes 40, 40 in the up-down direction. In the present embodiment, the attachment 38 is provided so as to incline with respect to the axis-perpendicular direction of the outer peripheral member 30, and be roughly parallel to the vehicle front-back direction.

By the rubber elastic body 32 being bonded to the outer peripheral surface of the inside shaft member 28 having the above-described configuration, and by the rubber elastic body 32 being bonded to the radially inner surface of the outer peripheral member 30, the inside shaft member 28 and the outer peripheral member 30 are elastically connected by the rubber elastic body 32. Specifically, the rubber elastic body 32 includes a portion broadening and extending from the left-right opposite sides of the inside shaft member 28 toward the vehicle front side with a prescribed peripheral dimension. Moreover, there is formed a lightening space 42 that perforates the rubber elastic body 32 in the up-down direction with a prescribed peripheral dimension on the vehicle front side of the inside shaft member 28. With this arrangement, the rubber elastic body 32 is provided with rubber arms 44, 44 extending from the left-right opposite sides of the inside shaft member 28 toward the vehicle diagonal front side, and is configured such that the separation distance between the rubber arms 44, 44 in the left-right direction gradually becomes larger toward the front.

Meanwhile, to the outer peripheral surface on the vehicle back side of the inside shaft member 28, a cushioning rubber 46 is bonded so as to project to the vehicle back side. The cushioning rubber 46 has an approximately rectangular tube shape, and extends in the center axis direction of the inside shaft member 28 and the outer peripheral member 30. Besides, the cushioning rubber 46 includes a generally rectangular-shaped insertion hole 48 that perforates the approximate center of the cushioning rubber 46 in the center axis direction of the inside shaft member 28 and the outer peripheral member 30.

Moreover, covering rubber layers 50, 52 are respectively bonded to the outer peripheral surface of the inside shaft member 28 and the radially inner surface of the outer peripheral member 30 over the roughly entire faces thereof, and the rubber arms 44, 44, the cushioning rubber 46, and the covering rubber layers 50, 52 are integrally formed in the rubber elastic body 32. In the present embodiment, the rubber elastic body 32 takes the form of an integrally vulcanization molded component including the inside shaft member 28 and the outer peripheral member 30.

Furthermore, the covering rubber layer 52 that covers the radially inner surface of the outer peripheral member 30 includes a cushioning rubber 54 provided at the portion positioned below the cut-out window 36 which is provided on the vehicle front side, the cushioning rubber 54 projecting toward the vehicle back side, namely toward the inside shaft member 28. The cushioning rubber 54 extends in the center axis direction of the inside shaft member 28 and the outer peripheral member 30 with a left-right dimension and a length dimension becoming smaller toward the vehicle back side, so as to be tapered toward the vehicle back side.

In the present embodiment, the outer dimension of the first rubber bushing 16 and the outer dimension of the second rubber bushing 18 are different from each other, and the outer dimension of the second rubber bushing 18 is larger than the outer dimension of the first rubber bushing 16. Specifically, the maximum width dimension of the outer peripheral member 30 (the up-down dimension in FIG. 1 in the present embodiment) is larger than the maximum width dimension of the outer tubular member 22 (the up-down dimension or the left-right dimension in FIG. 2 since the outer peripheral configuration of the outer tubular member 22 is an approximate square in the present embodiment). With this configuration, the rubber elastic body 32 of the second rubber bushing 18 has an overall size and a rubber volume larger than those of the rubber elastic body 24 of the first rubber bushing 16.

The first rubber bushing 16 and the second rubber bushing 18 having the above-described structures are mounted onto the lengthwise opposite ends of a rod member 56 that extends in the vehicle front-back direction, so that the torque rod 10 of the present embodiment is constituted. This rod member 56 serves as the rod member according to the present invention. Specifically, the first rubber bushing 16 is mounted onto the lengthwise first end of the rod member 56 (on the left side in FIG. 1, namely, the vehicle front side), while the second rubber bushing 18 is mounted onto the lengthwise second end of the rod member 56 (on the right side in FIG. 1, namely, the vehicle back side). In the present embodiment, on the lengthwise first end of the rod member 56, the outer tubular member 22 of the first rubber bushing 16 is integrally formed with its center axis extending in the left-right direction.

The rod member 56 is an elongated component having an approximately rectangular cross section, and is a high rigidity component formed of metal or synthetic resin. The rod member 56 has a width dimension (a left-right dimension) smaller than a left-right width dimension of the cut-out window 36 provided to the outer peripheral member 30 of the second rubber bushing 18. In the present embodiment, the rod member 56 extends in the vehicle front-back direction from the vehicle back-side end of the first rubber bushing 16 while inclining diagonally upward to the back. As indicated by the dot-and-dash line in FIG. 6, the center axis 58 of at least the vehicle back-side portion of the rod member 56 extends in an approximately straight line, so as to be roughly orthogonal to the center axis of the second rubber bushing 18.

Figure 4:
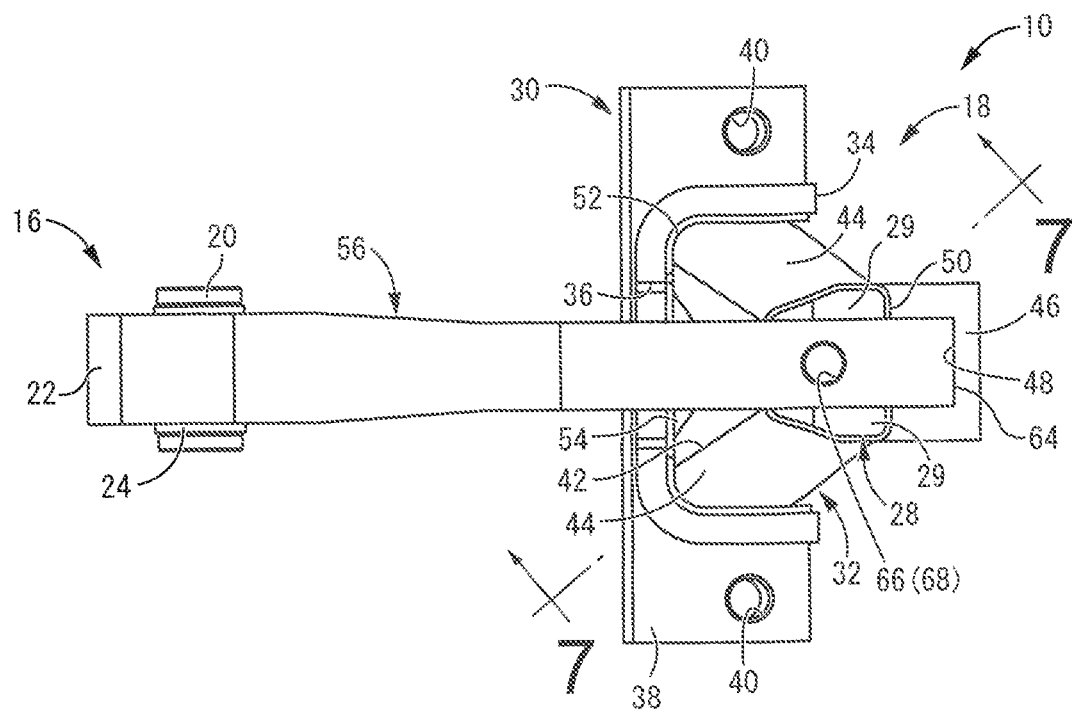
FIG. 4 is an arrow view A of the torque rod shown in FIG. 2.

Moreover, on the lengthwise second end of the rod member 56, a stopper projection 60 is formed so as to project in the direction orthogonal to the center axis 58 of the vehicle back-side portion (backward from the plane of the page in FIG. 4). Additionally, an abutting projection 62 is provided at a location closer to the lengthwise center of the rod member 56 than the stopper projection 60, namely, on the lengthwise first side (the side of the first rubber bushing 16) so as to project in the same direction as the stopper projection 60. The abutting projection 62 is remote from the stopper projection 60 in the vehicle front-back direction.

Both of the projections 60, 62 have a width dimension (a left-right dimension) roughly equal to that of the rod member 56, and each projecting dimension of the projections 60, 62 is made roughly equal to the axial dimension of the inside shaft member 28 of the second rubber bushing 18 excluding the positioning protrusions 29, 29. Besides, the projections 60, 62 each have a generally rectangular block shape. The stopper projection 60 is made smaller in size than the insertion hole 48 provided to the rubber elastic body 32 of the second rubber bushing 18, while the abutting projection 62 is made smaller in size than the lightening space 42 provided to the rubber elastic body 32. In the present embodiment, a vehicle back-side end face 64 of the rod member 56 including the stopper projection 60 comprises a flat surface extending in the direction orthogonal to the center axis 58 of the vehicle back-side portion of the rod member 56.

Also, in the rod member 56, a bolt insertion hole 66 is formed between the stopper projection 60 and the abutting projection 62 in the vehicle front-back direction so as to open in the direction of projection of the stopper projection 60 and the abutting projection 62 (downward in FIG. 7). In the present embodiment, the bolt insertion hole 66 perforates the rod member 56 in the direction orthogonal to the center axis 58 of the vehicle back-side portion of the rod member 56. A female thread is formed on the inner surface of the bolt insertion hole 66. The bolt insertion hole 66 may alternatively have a bottomed hole shape that does not perforate the rod member 56.

With the rod member 56 having the above-described structure, the integrally vulcanization molded component of the rubber elastic body 24 is inserted in a press-fit state and fixed to the outer tubular member 22 provided to the lengthwise first end of the rod member 56. Accordingly, the first rubber bushing 16 is provided on the lengthwise first end of the rod member 56.

Meanwhile, on the lengthwise second end of the rod member 56, the second rubber bushing 18 that is a part separate from the rod member 56 is provided. Specifically, the upper end face of the inside shaft member 28 in FIG. 7, which is the axial end face of the inside shaft member 28 excluding the positioning protrusions 29, 29, is superposed from the lower side in FIG. 7. Then, the rod member 56 is inserted between the positioning protrusions 29, 29 provided on the axial end face of the inside shaft member 28, while a fixing bolt 70 is inserted and fastened into the bolt insertion hole 66 of the rod member 56 as well as an inner hole 68 of the inside shaft member 28 of the second rubber bushing 18. Accordingly, the second rubber bushing 18 is fixedly provided on the lengthwise second end of the rod member 56. Therefore, in the present embodiment, the bolt insertion hole 66 provided to the rod member 56 constitutes the fixture of the rod member 56 to be fixed to the inside shaft member 28 of the second rubber bushing 18. Besides, regarding the second rubber bushing 18, the inner hole 68 provided to the inside shaft member 28 constitutes the fixture to receive the lengthwise second end of the rod member 56.

With the rod member 56 and the second rubber bushing 18 fixed in this way, the lengthwise middle portion of the rod member 56 is arranged such that its transverse cross section is partially inserted in the cut-out window 36, which is provided on the vehicle front side of the outer peripheral member 30 of the second rubber bushing 18. Specifically, the rod member 56 extending from the vehicle front side extends inward of the outer peripheral member 30 through the cut-out window 36. Then, the rod member 56 extends to the vehicle back side of the outer peripheral member 30 via the aperture window 34, so that the second end of the rod member 56 is fixed to the inside shaft member 28 on the vehicle back side of the outer peripheral member 30. Besides, the stopper projection 60 provided to the lengthwise second end is inserted in the insertion hole 48 provided to the rubber elastic body 32 of the second rubber bushing 18. Thus, the vehicle back-side face of the stopper projection 60 (the vehicle back-side end face 64) and the radially inner surface of the insertion hole 48, the surface being on the vehicle back side, are superposed on each other, so that the cushioning rubber 46 is in a state of abutment against the vehicle back-side end face 64, or is in a pre-compressed state by being pressed by the vehicle back-side end face 64. With this configuration, the vehicle back-side end face 64, which is the tip end face on the lengthwise second side of the rod member 56, is positioned on the vehicle back side of the inside shaft member 28. It should be appreciated that the vehicle back-side face of the stopper projection 60 (the vehicle back-side end face 64) and the radially inner surface of the insertion hole 48, the surface being on the vehicle back side, may be remote from each other in the vehicle front-back direction.

In this embodiment in particular, the vehicle back-side end face 64 of the rod member 56 includes the stopper projection 60 and comprises a large flat surface that extends in the direction orthogonal to the center axis 58. With this configuration, as will be described later, when an external force is exerted on the torque rod 10 and the vehicle back-side end face 64 of the rod member 56 and the vehicle body 14 serving as the connection target member come into abutment, the abutment can take place with a sufficiently large area.

Besides, with the rod member 56 and the second rubber bushing 18 fixed, the abutting projection 62 extending from the rod member 56 downward in FIG. 7 is inserted in the lightening space 42 provided between the opposite faces of the inside shaft member 28 and the outer peripheral member 30. In other words, the abutting projection 62 provided at a location closer to the lengthwise center (the side of the first rubber bushing 16) of the rod member 56 than the portion fixed to the inside shaft member 28 of the second rubber bushing 18 (the bolt insertion hole 66) is, and the abutting projection 62 projects toward the inside of the second rubber bushing 18. In the present embodiment, with no external load exerted on the torque rod 10, the abutting projection 62 is inserted in the roughly center of the lightening space 42 without abutting against any of the rubber arms 44, 44 that are positioned on the outer peripheral side of the lightening space 42, the cushioning rubber 54, and the covering rubber layer 50 bonded to the outer peripheral surface of the inside shaft member 28. Specifically, the abutting projection 62 is opposed to the outer peripheral member 30 via the cushioning rubber 54, and as will be described later, when an external force is exerted on the torque rod 10, the vehicle front-side face 71 of the abutting projection 62 comes into abutment against the outer peripheral member 30 via the cushioning rubber 54.

With the torque rod 10 having the structure described above, by an attaching bolt 72 being inserted into the inner axial member 20 of the first rubber bushing 16 so as to be threaded onto the power unit 12, the first rubber bushing 16 is attached to the power unit 12. Meanwhile, by attaching bolts 74 being inserted into the respective bolt insertion holes 40 of the outer peripheral member 30 of the second rubber bushing 18 so as to be threaded onto the vehicle body 14, the second rubber bushing 18 is attached to the vehicle body 14. With this arrangement, the power unit 12 is elastically connected to the vehicle body 14 by the torque rod 10. In other words, the connection target members connected to each other by the torque rod 10 comprise the power unit 12 and the vehicle body 14. Besides, the connection portion of the power unit 12 and the connection portion of the vehicle body 14 are respectively constituted by the attachment portion of the first rubber bushing 16 and the attachment portion of the second rubber bushing 18 of the torque rod 10 (the inner hole of the inner axial member 20 and the bolt insertion holes 40).

Here, the vehicle body 14 includes not only an attachment target 76 onto which the attaching bolts 74 are threaded, but also an opposed wall 78 configured to be opposed to the vehicle back-side end face 64 of the rod member 56 via the cushioning rubber 46 when the torque rod 10 is attached to the vehicle body 14. With this configuration, as will be described later, when an external force is exerted on the torque rod 10, the vehicle back-side end face 64 of the rod member 56 comes into abutment against the opposed wall 78 of the vehicle body 14 via the cushioning rubber 46 but without interposing the outer peripheral member 30 of the second rubber bushing 18. Accordingly, the vehicle back-side end face 64 and a front face 79 of the opposed wall 78 constitute the opposite faces that are opposed to each other in the vehicle front-back direction. In the present embodiment, there is provided a gap of a prescribed distance between the cushioning rubber 46 and the opposed wall 78 of the vehicle body 14.

Then, during acceleration or deceleration of the vehicle, the torque rod 10, which is mounted astride the power unit 12 and the vehicle body 14, limits relative displacement induced by torque reaction force between the power unit 12 and the vehicle body 14 in cushioned fashion. This will efficiently restrict, for example, rotation of the power unit 12 with respect to the vehicle body 14 about the principal axis of inertia. At that time, when the torque reaction force generates in the direction in which the connection portion of the torque rod 10 to the power unit 12 and the connection portion of the torque rod 10 to the vehicle body 14 approach each other, for example, compression force in the lengthwise direction is exerted on the torque rod 10. As a result, in the second rubber bushing 18, the inside shaft member 28, together with the rod member 56, displaces backward with respect to the outer peripheral member 30 accompanied by elastic deformation of the rubber arms 44, 44. Here, the remote distance between the vehicle back-side end face 64 of the rod member 56 and the vehicle body 14 is made smaller than the remote distance between the inside shaft member 28 and the vehicle body 14. Thus, the vehicle back-side end face 64 of the rod member 56 comes into abutment against the opposed wall 78 of the vehicle body 14, so as to limit the amount of elastic deformation of the rubber arms 44, 44.

Specifically, in the present embodiment, the abutting face of the rod member 56 configured to abut against the opposed wall 78 of the vehicle body 14 is constituted by the vehicle back-side end face 64, which is the lengthwise second tip end face of the rod member 56. Then, by the vehicle back-side end face 64 and the opposed wall 78 of the vehicle body 14 abutting against each other without interposing the outer peripheral member 30 of the second rubber bushing 18, a stopper 80 is constituted so as to limit elastic deformation of the rubber elastic body 32 of the second rubber bushing 18, especially the rubber arms 44, 44, in the direction of being pulled toward the vehicle back side.

In this embodiment in particular, since the cushioning rubber 46 is provided between the opposite faces of the vehicle back-side end face 64 of the rod member 56 and the front face 79 of the opposed wall 78 of the vehicle body 14, the rod member 56 abuts against the vehicle body 14 via the cushioning rubber 46. This configuration may prevent or moderate occurrence of impact or noise due to mutual strike (abutment) of the rod member 56 and the vehicle body 14.

On the other hand, when the torque reaction force generates in the direction in which the connection portion of the torque rod 10 to the power unit 12 and the connection portion of the torque rod 10 to the vehicle body 14 separate from each other, tensile force in the lengthwise direction is exerted on the torque rod 10. As a result, in the second rubber bushing 18, the inside shaft member 28 fixed to the rod member 56 displaces forward with respect to the outer peripheral member 30 accompanied by elastic deformation of the rubber arms 44, 44. Here, the remote distance between the abutting projection 62 of the rod member 56 and the outer peripheral member 30 is made smaller than the remote distance between the inside shaft member 28 and the outer peripheral member 30. Thus, the vehicle front-side face 71 of abutting projection 62 comes into abutment against the outer peripheral member 30, so as to limit the amount of elastic deformation of the rubber arms 44, 44.

Specifically, in the present embodiment, the vehicle front-side face 71 of the abutting projection 62 of the rod member 56 and the outer peripheral member 30 are configured to abut against each other. By the vehicle front-side face 71 and the outer peripheral member 30 being disposed in opposition within the lightening space 42 on the vehicle front side, a sub-stopper 82 is constituted so as to limit elastic deformation of the rubber elastic body 32 of the second rubber bushing 18, especially the rubber arms 44, 44, in the direction of being compressed toward the vehicle front side. Therefore, on the front side of the inside shaft member 28 in the lengthwise direction of the rod member 56, the sub-stopper 82 is configured to limit the amount of elastic deformation of the rubber elastic body 32 in the direction opposite to the direction of the elastic deformation limited by the stopper 80.

In this embodiment in particular, the cushioning rubber 54 is provided between the abutting projection 62 and the outer peripheral member 30 opposed in the vehicle front-back direction, so that the abutting projection 62 abuts against the outer peripheral member 30 via the cushioning rubber 54. This may prevent occurrence of impact or noise due to mutual strike of the abutting projection 62 of the rod member 56 and the outer peripheral member 30.

With the torque rod 10 according to the present embodiment having the structure described above, the outer peripheral member 30 is fixed to the vehicle body 14, and the inside shaft member 28 is configured to displace within the outer peripheral member 30. Thus, unlike the above-mentioned JP-A-2000-065113, it is not necessary to provide a large space on the outer peripheral side for displacement of the outer peripheral member 30. This makes it possible to minimize the surrounding space for disposition required during mounting of the second rubber bushing 18 of the torque rod 10 onto the vehicle body 14.

Besides, with the torque rod 10 according to the present embodiment, the rod member 56 and the second rubber bushing 18 are separate parts. Accordingly, it is possible to modify the design for one of the rod member 56 and the second rubber bushing 18 or to change their mutual combination, thereby making it easy to improve efficiency in characteristics tuning, to have some parts in common among different types of vehicle, or the like.

Also, the second rubber bushing 18 according to the present embodiment is configured to be fixed to the vehicle body 14 by the attachment 38 projecting on the outer peripheral surface of the outer peripheral member 30. Thus, in comparison with the press-fit-fastening structure, a larger degree of freedom will be obtained in the structure, shape, or the like of the fixing part of the vehicle body 14.

With the torque rod 10 constructed in the above manner, the stopper 80 is constituted at the portion where the rod member 56 and the vehicle body 14 serving as the connection target member are in contact. Accordingly, contact force due to the stopper 80 can be prevented from directly acting on the portion where the rod member 56 and the inside shaft member 28 are fixed. This makes it possible to effectively avoid adverse effect on the portion where the inside shaft member 28 and the rod member 56 are fixed or the like, which may be exerted by a large contact force applied to the stopper 80.

Further, in the present embodiment, in the stopper 80, the vehicle back-side portion of the rod member 56 extends in an approximately straight line from the second rubber bushing 18, and the vehicle back-side end face 64 extends in the direction roughly orthogonal to the center axis 58 of the vehicle back-side portion of the rod member 56. Thus, the external force due to abutment against the outer peripheral member 30 will be efficiently exerted on the rod member 56 as compression force in the axial direction. This makes it possible to inhibit bending or shearing stress induced in the rod member 56 so as to even more efficiently utilize the component strength of the rod member 56, thereby further improving stopper load bearing capability.

Additionally, in the present embodiment, the first rubber bushing 16 and the second rubber bushing 18 are provided on the lengthwise opposite ends of the torque rod 10, and the second rubber bushing 18 has the larger outer dimension and the greater vibration damping ability in comparison with the first rubber bushing 16. The second rubber bushing 18 adopts the fastening structure of the rod member 56 and the inside shaft member 28 as well as the stopper structure utilizing the direct abutment of the rod member 56 and the vehicle body 14. Accordingly, the large-sized second rubber bushing 18 may even more efficiently obtain compactification of the disposition space and improvement in the stopper load bearing capability.

Moreover, in the present embodiment, the outer peripheral member 30 is provided with the aperture window 34. The rod member 56 extends to the vehicle back side via the aperture window 34 so as to abut against the vehicle body 14. This will avoid complicated shapes of the outer peripheral member 30 and the vehicle body 14.

Furthermore, in the present embodiment, the rod member 56 is inserted in the cut-out window 36 of the outer peripheral member 30. This will minimize the projecting dimension of the rod member 56 from the second rubber bushing 18, and hence the space for disposing the torque rod 10. Besides, when the rod member 56 is detached from the second rubber bushing 18, it is possible to detach the rod member 56 in such a way as to pull out upwardly from the second rubber bushing 18 via the cut-out window 36.

While the present invention has been described hereinabove in terms of the embodiment, these are merely exemplary, and the invention shall not be construed as limited in any way to the specific disclosures in the embodiment.

For example, in the preceding embodiment, the aperture window 34 is provided on the vehicle back side of the outer peripheral member 30 and the outer peripheral member 30 covers the inside shaft member 28 from the vehicle front side, while the rod member 56 is configured to abut against the vehicle body 14 positioned on the vehicle back side of the outer peripheral member 30 via the aperture window 34. However, the present invention is not limited to such mode. Specifically, it may also be acceptable that the aperture window 34 is provided on the vehicle front side of the outer peripheral member 30, and the outer peripheral member 30 has a roughly semicircular tube shape or an overturned, roughly U-letter shape which opens to the vehicle front side, so as to cover the inside shaft member 28 from the vehicle back side. In such case, it would also be possible that the vehicle body 14 is provided on the vehicle front side of the outer peripheral member 30, and by the abutting projection 62 of the rod member 56 abutting against the vehicle body 14, the stopper is constituted. In this case, the abutting face configured to abut against the vehicle body 14 (the connection target member) is constituted by the vehicle front-side face 71 of the abutting projection 62 of the rod member 56.

Alternatively, it would also be acceptable that the aperture window 34 is provided on each side of the outer peripheral member 30 in the vehicle front-back direction, and the outer peripheral member 30 is constituted by a pair of components which are completely divided and are opposed in the left-right direction. In such case, the vehicle body 14 is provided on each side of the outer peripheral member 30 in the vehicle front-back direction. By the vehicle back-side end face 64 of the rod member 56 abutting against the vehicle body 14 on the vehicle back side, a first stopper is constituted as the stopper, while by the abutting projection 62 of the rod member 56 abutting against the vehicle body 14 on the front side, a second stopper is constituted as the stopper.

The aperture window 34 is not limited to the one that is formed astride the opposite sides in the axial direction as described in the preceding embodiment. Specifically, it would also be possible for the aperture window 34 to be formed at the axial end edge of the outer peripheral member 30 with the depth that does not reach the axially opposite end edge thereof, or alternatively to be formed so as to perforate the axially medial portion of the outer peripheral member 30 in the thickness direction. Therefore, the outer peripheral member 30 is not limited to have a partial peripheral wall shape that does not continue along the entire periphery in the peripheral direction, but may have a tubular shape that continues along the entire periphery in the peripheral direction.

Even in the case in which the outer peripheral member 30 has a tubular shape that continues along the entire periphery in the peripheral direction, it is possible to constitute the stopper 80 at the axial outside of the outer peripheral member 30 without interposing the outer peripheral member 30 by disposing the vehicle back-side end face 64 of the rod member 56 in opposition to the vehicle body 14 so as to pass the axial outside of the outer peripheral member 30, for example. Therefore, with respect to the outer peripheral member 30 according to the present invention, the aperture window 34 is not essential, and even if the aperture window 34 is provided, the shape of the outer peripheral member 30 is not limited in any way. Specifically, the outer peripheral member 30 may have a roughly C-letter shape, an approximate shape of right-angle three-sided polygon, a pair of plate shape that are disposed so as to be remote and opposed on the widthwise opposite sides of the rod member 56, or the like, other than a roughly semicircular tube shape or a roughly overturned U-letter shape as described in the preceding embodiment. It is acceptable as long as the stopper 80 is constituted such that the rod member 56 abuts against the connection target member (the vehicle body 14) without interposing the outer peripheral member 30. Thus, for example, it would also be possible that, for example, the inside shaft member 28 and the outer peripheral member 30 or the vehicle body 14 are configured to abut against the stopper 80 via a cushioning rubber or the like in a supplementary or additional manner to the extent that does not affect the strength at the fixture of the inside shaft member and the rod member, which is the problem the present invention attempts to solve.

Also, in the preceding embodiment, by the stopper projection 60 of the rod member 56 being inserted into the insertion hole 48 provided to the cushioning rubber 46, the cushioning rubber 46 is provided on the vehicle back side of the stopper projection 60 so as to be opposed to the opposed wall 78 of the vehicle body 14. However, the present invention is not limited to such mode. Specifically, for example, the cushioning rubber 46 may be provided to the vehicle body 14 side instead of or in addition to the stopper projection 60 side so that the stopper projection 60 of the rod member 56 and the opposed wall 78 of the vehicle body 14 are opposed to each other. Similarly, the cushioning rubber 54 provided between the abutting projection 62 of the rod member 56 and the outer peripheral member 30 may be provided on the abutting projection 62 side instead of or in addition to the rod member 56 side. However, in the present invention, the cushioning rubber 46 provided between the vehicle back-side end face 64 of the rod member 56 and the vehicle body 14, and the cushioning rubber 54 provided between the abutting projection 62 of the rod member 56 and the outer peripheral member 30 are not essential.

Moreover, in the preceding embodiment, the cut-out window 36 is formed so as to be opened at the axial end edge of the outer peripheral member 30, but the present invention is not limited to such mode. Specifically, the cut-out window 36 may be formed so as to perforate the axially medial portion of the outer peripheral member 30 in the thickness direction, and the rod member 56 may be inserted into the outer peripheral member 30 from the axis-perpendicular direction of the outer peripheral member 30 so as to be fixed to the inside shaft member 28. Therefore, in the present invention, the stopper projection 60 and the abutting projection 62 are not essential. Besides, in the present invention, the cut-out window 36 is not essential either. Specifically, for example, it would also be acceptable that the vehicle back-side portion of the rod member 56 has a curved shape, and the lengthwise second end of the rod member 56 is arranged within the outer peripheral member 30 so as to overpass the wall on the vehicle front side of the outer peripheral member 30.

Furthermore, in the present invention, for the first rubber bushing 16, what is publicly known is suitably adoptable without any limitation. For example, a ball joint, a sliding sleeve, or the like can be adopted. Also, for the connecting structure of the rod member 56 and the inside shaft member 28 in the second rubber bushing 18, it is possible to adopt various connecting structures of publicly known such as welding, riveting, and swage fastening other than bolt fastening as illustrated.

Even when the first rubber bushing 16 is provided, the present invention is not limited to the mode as described in the preceding embodiment, in which the integrally vulcanization molded component of the rubber elastic body 24 is press-fitted into the outer tubular member 22 (the rod member 56). For the first rubber bushing 16, it would also be possible that an integrally vulcanization molded component of the rubber elastic body 24 including the inner axial member 20 and the outer tubular member 22 is secured by being press-fitted into an arm eye having a round tubular shape provided to the rod member 56, or the like.

Besides, in the preceding embodiment, there are provided the first rubber bushing 16 and the second rubber bushing 18, and the outer dimension of the second rubber bushing 18 is made larger than that of the first rubber bushing 16. However, the first rubber bushing 16 and the second rubber bushing 18 may have a roughly equal size, or alternatively, the outer dimension of the first rubber bushing 16 may be made larger than that of the second rubber bushing 18. Further, the first rubber bushing 16 may adopt the structure similar to that of the second rubber bushing 18. Specifically, it would also be acceptable that the first rubber bushing 16 is a part separate from the rod member 56, and its inside shaft member is fixed to the rod member 56. By the rod member 56 and the power unit 12 serving as the connection target member coming into abutment, a stopper may be provided so as to limit an amount of elastic deformation of the rubber elastic body 24 of the first rubber bushing 16.

What is claimed is:

1. A torque rod configured to be mounted astride connection target members, comprising:
   a rod member; and
   a rubber bushing provided at a lengthwise end of the rod member, wherein
   the rubber bushing includes an inside shaft member, an outer peripheral member spaced away from the inside shaft member to an outer peripheral side and configured to be attached to one of the connection target members, and a rubber elastic body connecting the inside shaft member and the outer peripheral member with each other,
   the lengthwise end of the rod member is fixed to the inside shaft member of the rubber bushing constituted by a part separate from the rod member, and
   the rod member includes an abutting face to abut against the one of the connection target members without interposing the outer peripheral member of the rubber bushing, and a stopper to limit an amount of elastic deformation of the rubber elastic body in the rubber bushing is constituted by including the abutting face of the rod member,
   wherein the outer peripheral member of the rubber bushing includes an aperture window extending partially in a peripheral direction, and the abutting face of the rod member is configured to abut against the one of the connection target members via the aperture window.

2. The torque rod according to claim 1, wherein
   the torque rod has another rubber bushing with a different outer dimension from an outer dimension of the rubber bushing, at another lengthwise end of the rod member,
   the outer dimension of the rubber bushing is larger than the outer dimension of the other rubber bushing, and
   the lengthwise end of the rod member is fixed to the inside shaft member of the rubber bushing, and the rod member includes the abutting face to abut against the connection target member to which the rubber bushing is configured to be attached.

3. The torque rod according to claim 1, wherein
   the aperture window is formed astride opposite sides of the outer peripheral member in an axial direction such that the outer peripheral member is cut by the aperture window in the peripheral direction, and
   the abutting face comprises a lengthwise tip face of the rod member, and the stopper is constituted by the abutting face abutting against the one of the connection target members via the aperture window of the outer peripheral member.

4. The torque rod according to claim 1, wherein
   an abutting projection projecting toward an inside of the rubber bushing is provided in the rod member and located closer to a lengthwise center of the rod member than a portion fixed to the inside shaft member of the rubber bushing in the lengthwise end of the rod member is, and
   the abutting projection is opposed to the outer peripheral member via a cushioning rubber in a lengthwise direction of the rod member so that a sub-stopper is constituted, the sub-stopper being configured to limit an amount of elastic deformation of the rubber elastic body in a direction opposite to a direction of the elastic deformation to be limited by the stopper.

5. The torque rod according to claim 4, wherein the rubber bushing includes a lightening space provided at one side of the inside shaft member in a lengthwise direction of the rod member, and the sub-stopper is constituted in the lightening space so that the amount of the elastic deformation of the rubber elastic body in the direction opposite to the direction of the elastic deformation to be limited by the stopper is limited at the one side of the inside shaft member in the lengthwise direction of the rod member.

6. The torque rod according to claim 1, wherein the outer peripheral member of the rubber bushing has a cut-out window opened at an axial end edge thereof, and the rod member fixed to the inside shaft member of the rubber bushing is disposed to extend inward and outward of the outer peripheral member in a state of being inserted through the cut-out window.

7. The torque rod according to claim 1, wherein an attachment projecting to the outer peripheral side is provided at the outer peripheral member of the rubber bushing.

8. The torque rod according to claim 1, wherein the end of the rod member is superposed and fixed by bolting to an axial end face of the inside shaft member of the rubber bushing.

9. A rod member configured to be provided with a rubber bushing including an inside shaft member and an outer peripheral member spaced away from the inside shaft member to an outer peripheral side that are connected by a rubber elastic body with each other, the rod member constituting a torque rod to be mounted astride connection target members, the rod member for the torque rod comprising, at one lengthwise end thereof:
   a fixture to the inside shaft member of the rubber bushing; and
   an abutting face constituting a stopper, the stopper being configured to limit an amount of elastic deformation of the rubber elastic body of the rubber bushing by abutment of the abutting face against one of the connection target members to which the rubber bushing is attached,
   wherein the outer peripheral member of the rubber bushing includes an aperture window extending partially in a peripheral direction, and the abutting face of the rod member is configured to abut against the one of the connection target members via the aperture window.

10. A rubber bushing configured to be mounted at a lengthwise end of a rod member such that the rubber bushing constitutes a torque rod to be mounted astride connection target members, the rubber bushing comprising:
    an inside shaft member;

an outer peripheral member spaced away from the inside shaft member to an outer peripheral side;
a rubber elastic body connecting the inside shaft member and the outer peripheral member with each other;
a fixture configured to receive the lengthwise end of the rod member, the fixture being provided in the inside shaft member; and
a cushioning rubber to be arranged between opposite faces of a tip end of the rod member in the lengthwise direction and one of the connection target members, the cushioning rubber being configured to moderate impact of abutment of the tip end of the rod member against the one of the connection target members in a stopper provided by the abutment to limit an amount of elastic deformation of the rubber elastic body,
wherein the outer peripheral member of the rubber bushing includes an aperture window extending partially in a peripheral direction, and an abutting face of the rod member is configured to abut against the one of the connection target members via the aperture window.

* * * * *